United States Patent [19]

Norton et al.

[11] 3,827,499

[45] Aug. 6, 1974

[54] INJECTIVITY IN SUPPLEMENTED OIL RECOVERY

[75] Inventors: Charles J. Norton; David O. Falk, both of Denver; Robert E. Evans, Littleton, all of Colo.

[73] Assignee: Marathon Oil Company, Findlay, Ohio

[22] Filed: Oct. 2, 1972

[21] Appl. No.: 293,952

[52] U.S. Cl. .............................. 166/305 R, 166/274
[51] Int. Cl. .............................. E21b 43/16
[58] Field of Search ......... 166/273, 274, 275, 305 R

[56] References Cited
UNITED STATES PATENTS

| | | | |
|---|---|---|---|
| 3,020,953 | 2/1962 | Zerweck et al. | 166/274 |
| 3,297,084 | 1/1967 | Gogarty et al. | 166/273 |
| 3,330,343 | 7/1967 | Tosch et al. | 166/273 |
| 3,346,047 | 10/1967 | Townsend et al. | 166/273 |
| 3,580,337 | 5/1971 | Gogarty et al. | 166/273 |
| 3,658,130 | 4/1972 | Davis et al. | 166/273 |
| 3,677,344 | 7/1972 | Hayes et al. | 166/273 |

OTHER PUBLICATIONS

F. W. Smith, "The Behavior of Partially Hydrolyzed Polyacrylamide Solutions in Porous Media," Feb. 1970, pp. 148–156.

*Primary Examiner*—Frank L. Abbott
*Assistant Examiner*—Jack E. Ebel
*Attorney, Agent, or Firm*—Joseph C. Herring; Richard C. Willson, Jr.; Jack L. Hummel

[57] ABSTRACT

Oil recoveries with polyionic thickeners in aqueous slugs are improved by increasing the salt concentration in the slug to improve the injectivity and thereafter decreasing the salt concentration to obtain improved mobility control.

13 Claims, 7 Drawing Figures

HIGH SALINITY INJECTION (02219)

HIGH SALINITY INJECTION (02220)

HIGH SALINITY INJECTION (02228)

CONVENTIONAL PARTIALLY
HYDROLYZED POLYACRYLAMIDE (06117)

CONVENTIONAL PARTIALLY
HYDROLYZED POLYACRYLAMIDE (06118)

CONVENTIONAL PARTIALLY
HYDROLYZED POLYACRYLAMIDE (07101)

PARTIALLY HYDROLYZED POLYACRYLAMIDE RECOVERS
MORE OIL WHEN CONCENTRATED IN A SALINE FORE-SLUG RATHER
THAN UNIFORMLY DISPERSED IN FRESH WATER.

INJECTIVITY IN SUPPLEMENTED OIL RECOVERY

CROSS REFERENCES TO RELATED APPLICATIONS

The following commonly assigned United States patent applications relate to the general field of the invention:

Ser. No. 97,690 filed 1970, and now U.S. Pat. No. 3,707,190; and Ser. No. 156,937 filed 1971, and now U.S. Pat. No. 3,707,187.

BACKGROUND OF THE INVENTION

1. Field of the Invention

The present invention relates to the secondary-type recovery of petroleum from petroleum-bearing formations, more specifically to the design of displacement fluids for such secondary-type recovery, generally classified in the United States Patent Office in Class 166, subclasses 270 and /273.

2. Description of the Prior Art

A search of the United States Patent Office (class 166, subclass 273) disclosed the following prior art: U.S. Pat. No. 3,581,824 which injects ionic polysaccharide thickening agent which is subject to agglomeration in the presence of divalent cations. This agent is preceded by an aqueous liquid having a relatively high concentration of divalent cations; e.g., alkaline earth metal ions. Preferably, the first liquid additionally exhibits a monovalent cation concentration lower than the monovalent cation concentration of the formation water, and the liquid containing the thickening agent contains a monovalent cation concentration whick is greater than of the first injected liquid. (See column 2, lines 54-59.); U.S. Pat. No. 3,530,938 displaces oil with aqueous solutions of a specific sulfonate polymer which increases in viscosity with an increase in salt concentration. An aqueous solution of a salt, e.g., alkali metal halides (see column 4, lines 56-60) may be injected prior to or subsequent to the flooding medium. (See column 2, lines 9-15.); U.S. Pat. No. 3,346,047 claims (claim one) injecting a nonsaline surfactant solution, thereafter injecting a saline surfactant solution having a lower concentration of surfactant and thereafter injecting brine, (apparently no thickener is employed); U.S. Pat. No. 2,950,760 recovers oil by injecting a water solution of at least 1 salt; e.g., alkaline metal substituted beta-aminopropionic acid of specific configuration; U.S. Pat. No. 3,208,518 improves injectivity of polymer solutions by lowering their viscosity through adjustment of pH; and U.S. Pat. No. 3,372,748 recovers oil by first injecting a dilute aqueous polymer solution followed by a slug of dilute aqueous caustic solution which is in turn followed by water. The caustic causes desorption of polymer, thus minimizing losses in viscosity of the polymer solution due to depletion of the polymer.

None of the above references teaches the use of increased salt concentration in the front portion of a thickened slug in order to reduce the viscosity (and thus improve the injectivity).

SUMMARY OF THE INVENTION

General Statement of the Invention

According to the present invention, polyionic viscosity-increasing materials are formed into aqueous slugs and used either alone or preceded by high-displacement leading edge slugs, e.g., micellar dispersions containing hydrocarbons and surfactants with or without cosolvents salts, etc., surfactant-type flooding media, alcohol floods, gaseous and foam floods, etc., and/or followed by conventional drive fluids.

Such polyionic material as a viscosity-increasing compound has been used to prepare aqueous slugs for recovery of petroleum. However, it has been an important problem and a significant cost factor that the injection of these slugs into formations, to an economically limited number of injection wells, has required high pressures with consequent high pumping costs and relatively slow injection rates which have substantially reduced the return on investment of projects utilizing such flooding media.

The present invention achieves the advantage of good mobility control obtainable with such polyionic viscosity-increasing water-soluble mobility control agents but, in addition, temporarily reduces their viscosity (thus increasing their injectivity). The invention accomplishes this by initially providing a high salt content in conjunction with a polyionic material selected as having a viscosity which is substantially reduced in the presence of high concentrations of inorganic salts. Later, after injection of the slug into the reservoir, the salt content is reduced, e.g., by dilution with water containing lower concentrations of salts.

In the particularly preferred case of tertiary recovery, this dilution can be automatically achieved by the movement of the high salt concentration slug through the formation where it contacts the water left in the formation by the previous low salt concentration water flooding.

Though the invention is not to be limited to any particular hypothesis, it seems probable that the salt concentration which is initially high, tends to bind up water which might otherwise be loosely attached to the polyionic viscosity-increasing polymers, as water of hydration. Reduction of the salt concentration (or the providing of additional quantities of low-salt concentration water) provides additional water hydration for the polymer molecules thus allowing them to disperse in a more linear, more highly viscous form and providing excellent mobility ratios of drive fluid as compared to oil in place in the formation.

Utility of the Invention

As stated above, the present invention is useful for the secondary-type recovery of petroleum from formations. While most preferably employed with tertiary petroleum recovery, the invention is useful with secondary recovery and with the supplementing of primary recovery of petroleum from such formations.

DESCRIPTION OF THE PREFERRED EMBODIMENTS

Figure 1:
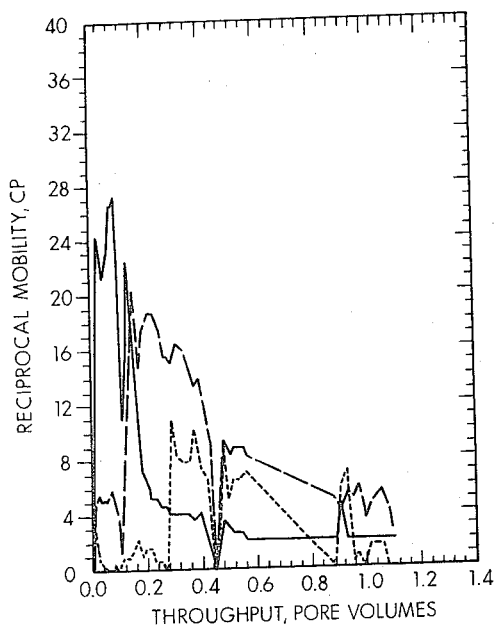
FIG. 1 (according to the present invention) shows reciprocal mobility vs. throughput of injected fluid for a high salinity injection of the same polymer at the salinity level shown in Table 1 as Example IV. In each of FIGS. 1-6, the solid line represents the first pressure tap, the long dashed line the middle pressure tap, and the short dotted line, the last pressure tap.

Starting Materials:

Polyionic viscosity-increasing compounds

Polyionic viscosity-increasing compounds can be any such compounds which show a significant decrease in viscosity in the presence of increased concentrations of inorganic salts. Examples of such compounds are: partially hydrolyzed polyacrylamides, copolymers containing vinyl carboxylate groups, copolymers containing vinyl sulfonate groups, copolymers containing aryl sulfonate groups and mixtures of the foregoing. Nonpolyionic viscosity-increasing compounds may be included in the compositions of the invention where desired.

Concentrations of the polyionic viscosity-increasing compounds will generally be within the range of from about 50 to about 10,000, more preferably from about 250 to about 5,000, and most preferably from about 500 to about 2,500 parts per million based on the total weight of the slug in which they are contained. Molecular weight of the polyionic viscosity-increasing compounds will generally be within the range of from about 1 million to about 100 million, more preferably from about 2 million to about 50 million, and most preferably from about 3 million to about 12 million. These compounds are generally formulated into slugs by simply mixing them in water at an appropriate temperature, e.g., in the range of from about 20° to about 100°C. Agitation sufficient to assist in the solution of the viscosity-increasing agents may be employed but extremely high shear mixing may have a deleterious effect on the molecular weight and thus on the mobility control characteristics of the polymer.

Inorganic Salts

Inorganic salts for use with the present invention will generally be selected on the basis of effectiveness and economy with the particular viscosity-increasing compositions to be employed. Examples of suitable inorganic salts include: sodium chloride, potassium chloride, magnesium chloride, lithium chloride, sodium carbonate, sodium bicarbonate, sodium sulfate, potassium sulfate, sodium phosphates, potassium phosphate and mixtures of the foregoing.

The concentration of the inorganic salts will preferably be in the range of from about 500 to about 300,000, more preferably from about 1,000 to about 100,000, and most preferably from about 5,000 to about 200,000 parts per million based on the weight of the slug in which they are contained. Naturally occurring brines will often provide an economic and convenient source of inorganic salts and connate water, may be particularly preferred, in general it will be employed by adding additional quantities of inorganic salts.

Water

The water used in the polyelectrolyte slug with the present invention may be connate water, e.g., highly saline Henry plant water, or brackish water. It is preferable that the water contain more than about 500, more preferably more than about 5,000, and most preferably more than about 10,000 parts per million of dissolved solids.

Supplementary Water

The supplementary water must have a lower concentration of inorganic salts than the slugs as they are originally injected. The supplementary water may be connate water found naturally in place in the formation, may be fresh water, or diluted connate water injected through wells spaced some distance from the well in which the original injection of the slug occurred, may be secondary water flooding water remaining in the formation along with tertiary oil after the completion of a secondary water flood, may be water which is injected into the original injection well after the injection of the slug so that mixing gradually occurs at the trailing edge of the saline slug as it moves through the formation.

Formations

The invention is useful with a wide variety of petroleum-bearing formations including those which have been previously flooded with water. In high permeability formations, the invention provides the substantial mobility ratio which is necessary to prevent fingering of the drive fluids through the oil in place. In low permeability formations the invention provides the rapid and lower pressure injection which are necessary to economical recovery of oil from such formations.

Examples

The invention will be more fully understood by reference to the following examples which are to be considered merely illustrative.

Examples I–III

Figure 4:
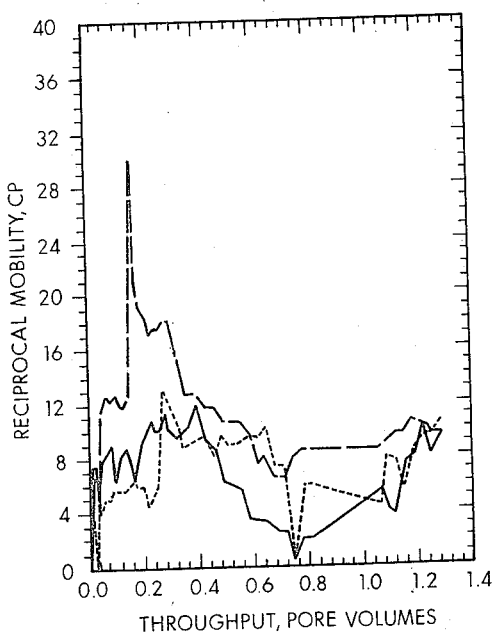
FIG. 4 is a plot of throughput (in pore volumes) vs. reciprocal mobility in centipoises as measured in each of three separate taps located approximately 10 percent, 50 percent, and 90 percent along the length of a 3 inch diameter × 4 foot fired Berea sandstone core, using conventional commercially available partially hydrolyzed polyacrylamide, e.g., Dow 700 manufactured by Dow Chemical Company of Midland, Mich., at approximately 500 parts per million (ppm) total salt concentration to provide a conventional comparative example.
Figure 5:
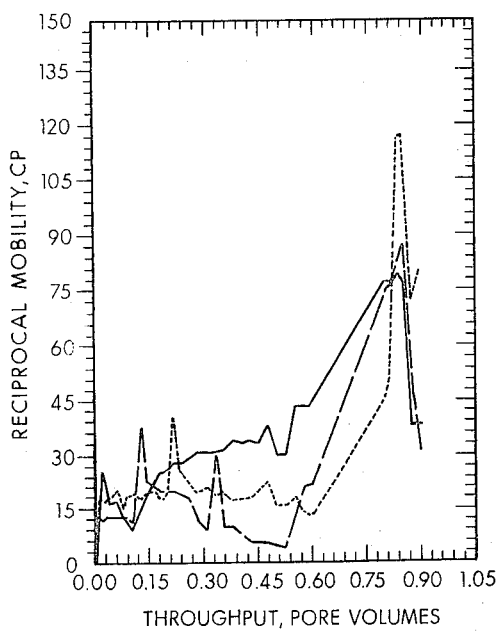
FIG. 5 is similar to FIG. 4 at the concentration shown in Table 1.
Figure 6:
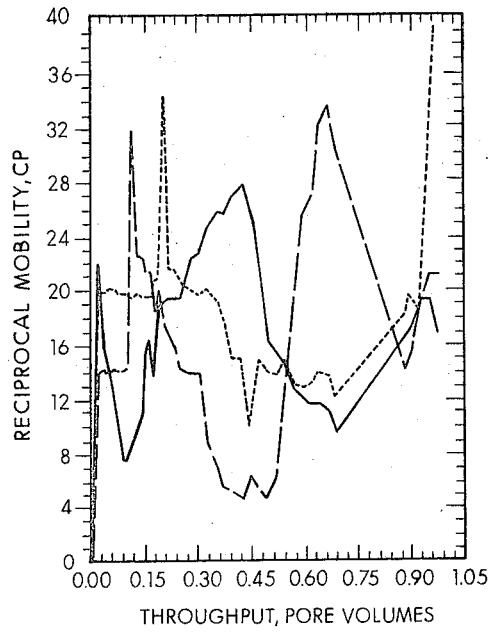
FIG. 6 is similar to FIG. 4 except that the concentration is as shown in Table 1.

Three conventional floods with partially hydrolyzed polyacrylamide (Dow 700) thickener uniformly dissolved in Palestine water (low salinity water) are made in 3 inch diameter × 4 foot long Berea sandstone core using standard procedures of core flooding. The reciprocal mobility data of these runs are shown in FIGS. 4–6 corresponding to Examples I–III, respectively, and oil recovery data are calculated in Table 1, part A. In all three conventional runs, after the preparation of the core and the initial water flood, approximately one pore volume injection containing 500 parts per million of the partially hydrolyzed (PHPA) is made. The average residual oil recovery for the three conventional runs is 60.7 ± 0.4 percent.

Examples IV–VI

Figure 2:
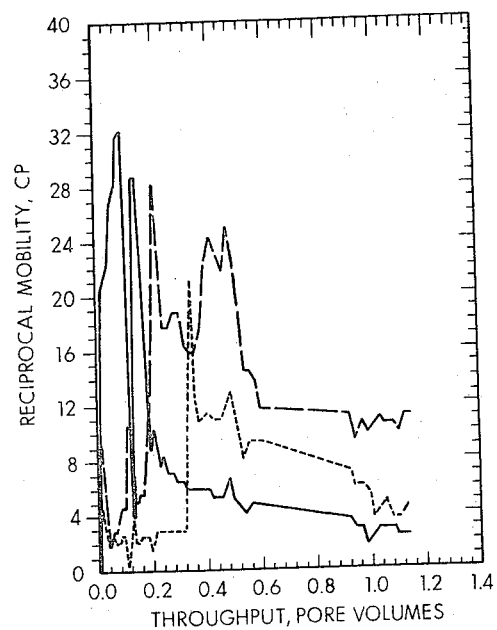
FIG. 2 (according to the present invention) also shows a high salinity injection at the salt concentration shown in Table 1 as Example V.
Figure 3:
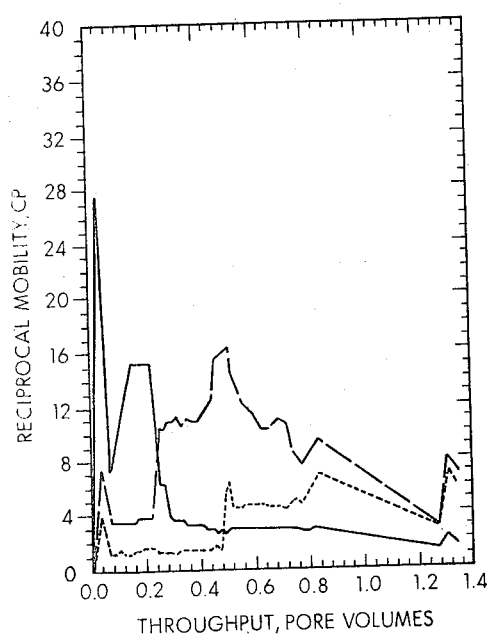
FIG. 3 (according to the present invention) also shows a high salinity injection at the salt concentration shown in Table 1 as Example VI.

Three high-salinity, partially hydrolyzed polyacrylamide (Dow 700) pusher floods were made in 3 inch diameter × 4 foot long fired Berea sandstone cores using standard procedures of core flooding. The reciprocal mobility data for these runs are shown in FIGS. 1-3 corresponding to Examples IV-VI, respectively, and oil recovery data are tabulated in Table 1, part B. In all three runs, after preparation of the core and the initial water flood, a 0.10 pore volume injection containing 2,500 parts per million of the partially hydrolyzed polyacrylamide (PHPA) was made. This is only 50 percent of total amount of pusher used in one pore volume at 500 parts per million concentration in the one pore volume used in the preceding Examples I-III. The average residual oil recovery for the three runs was 66.0 ± 10.7 percent. These results are significantly better than the results of Examples IV-VI above using the conventional PHPA floods even though twice as much viscosity-increasing agent was utilized in these Examples, IV-VI. Obviously saline injection of the thickener in a fore slug is more efficient than the injection of twice the amount of thickener in non-saline water at lower concentration over the same total pore volume of flooding water.

pear to be a fairly low value at the start, moderating gradually toward the mid-point of injection and then trending upward toward the end.

These injection profiles may be compared with those of the present invention in which the reciprocal mobility vs. pore volume plots (FIGS. 1-3) for the saline water fore slug injections are much more regular and uniform. The initial injection at the first port shows a substantial increase in value for a short duration. The pressure, as reflected in the reciprocal mobility values, declines through the course of the pore volume injection more regularly than with the PHPA under conventional conditions. Lower average reciprocal mobility values obtained over the course of the high salinity flood according to the invention than were present in the conventional floods.

Examples VII-X

Using the techniques of Examples I-VI, and the same conditions of Table 1, Examples VII-X were run with the results summarized in Table 2. These results, plot-

TABLE 1
SUMMARY OF SUPPLEMENTED OIL RECOVERIES[1]

| Example No. | Run No. | Core Data | | | Preparative Water Flood % PV | | | | | Thickener ppm | Total Thickened Water Recovery | |
|---|---|---|---|---|---|---|---|---|---|---|---|---|
| | | PV cc | Poros-ity % | Perme-ability md | $O_i$ | $W_i$ | $O_r$ | $W_r$ | % Eff. | | PV | % $O_r$ |

A. Conventional with thickener uniformly dissolved in Palestine Water

| I | 06117 | 1025 | 19.9 | 622 | 63.7 | 36.3 | 40.5 | 59.5 | 36.4 | 1 PV Dow 700 (500 ppm) in Palestine water[2] | 0.963 | 60.3 |
| II | 06118 | 1038 | 20.2 | 628 | 63.8 | 36.2 | 38.4 | 61.6 | 39.8 | 1 PV Dow 700 (500 ppm) in Palestine water | 0.957 | 60.8 |
| III | 07101 | 1031 | 20.0 | 557 | 62.3 | 37.7 | 38.9 | 61.1 | 37.6 | 1 PV Dow 700 (500 ppm) in Palestine water | 0.968 | 60.9 |

B. Thickener in Fore slug pushed by saline Henry water

| IV | 02219 | 1158 | 22.5 | 1019 | 63.7 | 36.3 | 30.8 | 69.2 | 51.6 | 0.10 PV Dow 700 (2500 ppm) in Palestine water pushed by Henry Plant water[3] | 1.133 | 69.3 |
| V | 02220 | 1133 | 22.0 | 1042 | 63.9 | 36.1 | 30.1 | 69.7 | 52.9 | do. | 1.134 | 77.1 |
| VI | 02228 | 1121 | 21.8 | 969 | 63.2 | 36.8 | 27.4 | 72.6 | 56.6 | do. | 1.017 | 51.5 |

TABLE 2
SUMMARY OF SUPPLEMENTED OIL RECOVERIES[1]

Thickener in Fore slug pushed by Palestine Water

| Example No. | Run No. | PV cc | Poros-ity % | Perme-ability md | $O_i$ | $W_i$ | $O_r$ | $W_r$ | % Eff. | Thickener ppm | PV | % $O_r$ |
|---|---|---|---|---|---|---|---|---|---|---|---|---|
| VII | 03259 | 1093 | 21.2 | 770 | 61.7 | 38.3 | 28.7 | | 71.3 | 1 PV Dow 700 (500 ppm) in Palestine Water[2] | 0.919 | 41.1 |
| VIII | 03260 | 1075 | 20.9 | 759 | 61.6 | 38.4 | 26.7 | | 73.3 | 0.10 PV Dow 700 (2500 ppm) in Henry water[3] pushed by Palestine water | 0.865 | 39.5 |
| IX | 03261 | 1053 | 20.4 | 676 | 62.9 | 37.1 | 30.8 | | 69.2 | 0.10 PV Dow 700 (5000 ppm) in Henry water pushed by Palestine water | 1.026 | 72.0 |
| X | 03262 | 1072 | 20.8 | 701 | 61.6 | 38.4 | 27.7 | | 72.3 | do. | 1.007 | 75.3 |

Footnotes on each table:
1. 0.03 PV of Maraflood surfactant slug FF-561 pushed by the thickened water system.

Figure 7:
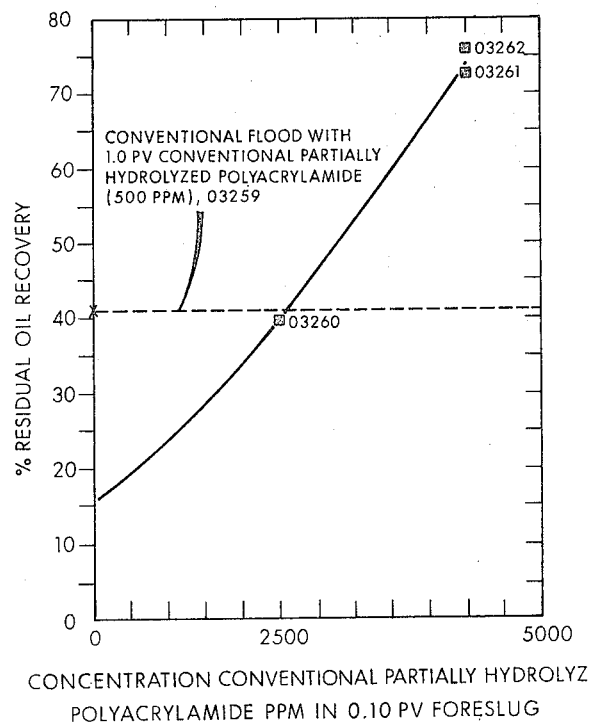
FIG. 7 is a plot of polyelectrolyte concentration vs. percent residual oil recovery showing that commercial partially hydrolyzed polyacrylamide recovers more oil when concentrated in a saline fore slug rather than uniformly dispersed in fresh water.

For comparison, conventional Dow 700 PHPA floods were made in which the reciprocal mobilities are plotted against pore volume throughputs in FIGS. 4-6, respectively. All of these cores had permeabilities in the neighborhood of 600, somewhat the permeabilities of the cores utilized in Examples IV-VI, which had permeabilities in the neighborhood of 1,000. No consistent injection profile pattern is apparent, but there does apted in FIG. 7 show that commercially available PHPA recovers more oil when concentrated in the saline fore slug and subsequently displaced with fairly fresh Palestine water, rather than when uniformly dispersed in fresh water.

This series of experiments was made with a second lot of Berea core with similar efficiencies for secondary oil recovery. Example VII is a repeat conventional run with 500 ppm Dow 700 uniformly dispersed in the Palestine water, and gives an oil recovery of only 41.1 percent of the residual oil left in place after the preliminary secondary water flood in this lot of Berea cores. In Example VIII in which 2,500 ppm Dow 700 was used in the first 0.10 PV, followed by Palestine water, an oil recovery of 39.5 percent is obtained, using only half the total amount of Dow 700 thickener as in Example VII. In Examples IX and X, the concentration of Dow 700 in the 0.10 PV fore slug is doubled with corresponding increased oil recoveries of 72.0 percent and 75.3 percent respectively.

MODIFICATIONS OF THE INVENTION

It should be understood that the invention is capable of a variety of modifications and variations which will be made apparent to those skilled in the art by a reading of the specification which are to be included within the spirit of the claims appended hereto.

For example, a series of pulse injections of thickener in saline water followed by a series of non-saline water injections, may be advantageously employed.

Polyacrylamides are thickening agents to be compounded in high salinity aqueous solutions to facilitate injection, with subsequent contact with caustic, e.g., NaOH to effect hydrolysis, and subsequent dilution with less saline, or with fresh water to increase the viscosity within the formation.

What is claimed is:

1. In a process for the secondary-type recovery of petroleum from petroleum-bearing formation comprising injecting an aqueous slug containing polyionic viscosity-increasing agents, to displace oil within said petroleum-bearing formation, the improvement comprising:
   a. selecting as said polyionic viscosity-increasing agents, compounds the viscosity of which is decreased by increasing the inorganic salt concentration in aqueous solutions containing such viscosity increasing agents,
   b. forming a slug comprising aqueous solutions of said viscosity-increasing agents,
   c. providing an increased inorganic salt concentration in said slug to improve the injectivity into said petroleum-bearing formation, and
   d. after injection of said slug, decreasing the inorganic salt concentration by admixing into said slug, quantities of water having lower inorganic salt concentrations than said slug in order to obtain improved mobility control within said formation.

2. A process according to claim 1 wherein said aqueous slug containing said polyionic viscosity-increasing compounds is preceded through said petroleum-bearing formations by slugs comprising surfactants.

3. A process according to claim 1 wherein said aqueous slug containing said polyionic viscosity-increasing compounds is preceded through said petroleum-bearing formations by at least one slug comprising micellar dispersions containing hydrocarbons and surfactants.

4. A process according to claim 1 wherein said polyionic viscosity-increasing agents comprise compositions selected from the group consisting of partially hydrolyzed polyacrylamides, copolymers containing vinyl carboxylate groups, copolymers containing vinyl sulfonate groups, copolymers containing aryl sulfonate groups, and mixtures of the foregoing.

5. A process according to claim 1 wherein said polyionic viscosity-increasing agents have molecular weights in the range of from about 0.1 million to about 100 million.

6. A process according to claim 2 wherein said polyionic viscosity-increasing agents have molecular weights in the range of from about 0.1 million to about 100 million.

7. A process according to claim 3 wherein said polyionic viscosity-increasing agents have molecular weights in the range of from about 0.1 million to about 100 million.

8. A process according to claim 1 wherein said increased concentration of inorganic salt is provided by adding a salt selected from the group consisting of: sodium chloride potassium chloride, magnesium chloride, lithium chloride, sodium carbonate, sodium bicarbonate, sodium sulfate, potassium sulfate, sodium phosphates, potassium phosphate, and mixtures of the foregoing.

9. A process according to claim 8 wherein said added inorganic salt comprises sodium chloride.

10. A process according to claim 1 wherein said increased inorganic salt concentration is provided by adding naturally occurring brines.

11. A process according to claim 1 wherein said inorganic salt concentration is from about 20 parts per million to about 300,000 parts per million during injection and wherein said admixing reduces the concentration of said inorganic salts in said slug by at least one-half.

12. A process according to claim 1 wherein said inorganic salt concentration is from about 20 parts per million to about 300,000 parts per million during injection and wherein said admixing reduces the concentration of said inorganic salts in said slug by at least 80 percent.

13. A process according to claim 1 in which said secondary-type recovery is the tertiary recovery of petroleum in formations previously flooded with some other flooding fluid.

* * * * *

UNITED STATES PATENT OFFICE
CERTIFICATE OF CORRECTION

Patent No. 3,827,499         Dated Aug. 6, 1974

Inventor(s) Charles J. Norton et al

It is certified that error appears in the above-identified patent and that said Letters Patent are hereby corrected as shown below:

Col. 1, line 34:    Delete "whick" and insert therefor --which--.

Col. 1, line 37:    Delete "sulfonate" and insert therefor --sulfonated--.

Col. 5-6, Table:    Footnotes 2 and 3 omitted:

--[2]The composition of Palestine water is 110 ppm $CaCl_2$ and 390 ppm NaCl.--.

--[3]The composition of Henry Plant water is 18,600 ppm total salts.-

Signed and Sealed this

Sixth Day of September 1977

[SEAL]

Attest:

RUTH C. MASON
Attesting Officer

LUTRELLE F. PARKER
Acting Commissioner of Patents and Trademarks